(12) United States Patent
Hung et al.

(10) Patent No.: US 12,401,485 B2
(45) Date of Patent: Aug. 26, 2025

(54) NETWORK COMMUNICATION APPARATUS AND NETWORK COMMUNICATION MONITORING METHOD THEREOF HAVING FULL BAND MONITORING MECHANISM

(71) Applicant: REALTEK SEMICONDUCTOR CORPORATION, Hsinchu (TW)

(72) Inventors: Kun-Chien Hung, Hsinchu (TW); Tai-I Huang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 468 days.

(21) Appl. No.: 17/970,386

(22) Filed: Oct. 20, 2022

(65) Prior Publication Data

US 2023/0145509 A1 May 11, 2023

(30) Foreign Application Priority Data

Nov. 10, 2021 (TW) .................................. 110141906

(51) Int. Cl.
*H04L 5/00* (2006.01)
*H04W 24/08* (2009.01)

(52) U.S. Cl.
CPC ............. *H04L 5/006* (2013.01); *H04W 24/08* (2013.01)

(58) Field of Classification Search
None
See application file for complete search history.

(56) References Cited

U.S. PATENT DOCUMENTS

| 2004/0228283 A1 | 11/2004 | Naguib |
| 2015/0105038 A1 | 4/2015 | Lascari et al. |

(Continued)

FOREIGN PATENT DOCUMENTS

| CN | 102761986 A | 10/2012 |
| CN | 104467994 A | 3/2015 |

(Continued)

OTHER PUBLICATIONS

1) OA letter of a counterpart TW application (appl. No. 110141906) mailed on 2022/07/12.2) Summary of the TW OA letter in regard to the TW counterpart application: 1. Claims 1,3 and 10 are rejected as allegedly being unpatentable in view of (EP 3139557A1) and (US 2004/0228283A1).Correspondence bewteen claims of TW counterpart application and claims of US application.2. Claims 1, 2-3, . . . , and 10 in TW counterpart application correspond to claims 1, 2-3, . . . ,9 and 11 in US application, respectively.

*Primary Examiner* — Saad Khawar
(74) *Attorney, Agent, or Firm* — WPAT, PC

(57) ABSTRACT

The present invention discloses a network communication apparatus having full band monitoring mechanism. An antenna circuit receives a set of wireless signals in a full band. A receiving circuit includes receivers to receive the set of wireless signals to generate a set of received signals. A first part of the receivers operate in a service mode to perform data receiving on corresponding operation frequency sub-bands, and a second part of the receivers operate in a monitoring mode to perform interference signal monitoring on monitoring frequency sub-bands in the full band. The sub-band filtering circuits filters one of the received signals generated by one of the receivers operated in the monitoring mode to generate a filtered signal. The monitoring circuits perform monitoring on the filtered signal generated by the sub-band filtering circuits to generate signal parameter statistical data.

20 Claims, 5 Drawing Sheets

(56) References Cited

U.S. PATENT DOCUMENTS

2015/0131527 A1     5/2015  Kenney et al.
2019/0141734 A1*    5/2019  Lei ........................ H04W 72/23
2022/0085910 A1*    3/2022  Sun ........................ H04L 5/001

FOREIGN PATENT DOCUMENTS

| CN | 106877947 A | 6/2017 |
| CN | 108574991 A | 9/2018 |
| CN | 108599879 A | 9/2018 |
| EP | 3139557 A1  | 3/2017 |

* cited by examiner

NETWORK COMMUNICATION APPARATUS AND NETWORK COMMUNICATION MONITORING METHOD THEREOF HAVING FULL BAND MONITORING MECHANISM

BACKGROUND OF THE INVENTION

1. Field of the Invention

The present invention relates to a network communication apparatus and a network communication monitoring method thereof having full band monitoring mechanism.

2. Description of Related Art

In wireless network communication, different loading conditions occur to different frequency bands due to the condition of the environment. For example, a larger amount of interference occurs to some frequency bands since more communications are performed therein. Almost no interference occurs to some other frequency bands since no communication is performed therein. Since the loading of the frequency bands affects the wireless communication quality, the efficiency of communication can be increased if a network communication apparatus is equipped with frequency band monitoring mechanism to monitor the condition of each of sub-bands.

However, the cost to obtain the loading information in current technology is too high. Further, the receivers in the network communication apparatus have to operate in an operation mode and a monitoring mode in an interlaced manner. When the number of the frequency bands is larger, the receivers need to spend more time to perform monitoring and data collection. The efficiency of the frequency monitoring decreases accordingly.

SUMMARY OF THE INVENTION

In consideration of the problem of the prior art, an object of the present invention is to supply a network communication apparatus and a network communication monitoring method thereof having full band monitoring mechanism.

The present invention discloses a network communication apparatus having full band monitoring mechanism that includes an antenna circuit, a receiving circuit, a plurality of sub-band filtering circuits and a plurality of monitoring circuits. The antenna circuit is configured to receive a set of wireless signals in a full band. The receiving circuit includes a plurality of receivers configured to receive the set of wireless signals to generate a set of received signals, wherein a first part of the receivers operate in a service mode to perform data signal receiving corresponding to an operation frequency sub-band, and a second part of the receivers operate in a monitoring mode to perform interference signal monitoring on a plurality of monitoring frequency sub-bands in the full band. The sub-band filtering circuits are configured to perform filtering on the set of received signals generated by the receivers that operate in the monitoring mode to generate a filtered signal. The monitoring circuits are configured to monitor the filtered signal generated by the sub-band filtering circuits to generate signal parameter statistical data.

The present invention also discloses a network communication monitoring method having full band monitoring mechanism that includes steps outlined below. A set of wireless signals in a full band are received by an antenna circuit. The set of wireless signals are received by a plurality of receivers included by a receiving circuit to generate a set of received signals, wherein a first part of the receivers operate in a service mode to perform data signal receiving corresponding to an operation frequency sub-band, and a second part of the receivers operate in a monitoring mode to perform interference signal monitoring on a plurality of monitoring frequency sub-bands in the full band. Filtering is performed on the set of received signals generated by the receivers that operate in the monitoring mode by a plurality of sub-band filtering circuits to generate a filtered signal. The filtered signal generated by the sub-band filtering circuits is monitored by a plurality of monitoring circuits to generate signal parameter statistical data.

These and other objectives of the present invention will no doubt become obvious to those of ordinary skill in the art behind reading the following detailed description of the preferred embodiments that are illustrated in the various figures and drawings.

DETAILED DESCRIPTION OF THE PREFERRED EMBODIMENTS

An aspect of the present invention is to provide a network communication apparatus and a network communication monitoring method thereof having full band monitoring mechanism to avoid the time-consuming process and the incomplete information generated due to continuous switching among different frequency bands by using receivers operating in a monitoring mode and by disposing corresponding filter circuits and monitoring circuits, such that a quick and complete full band monitoring can be accomplished to select a sub-band with better condition to perform communication according to the frequency band monitoring result.

Figure 1:
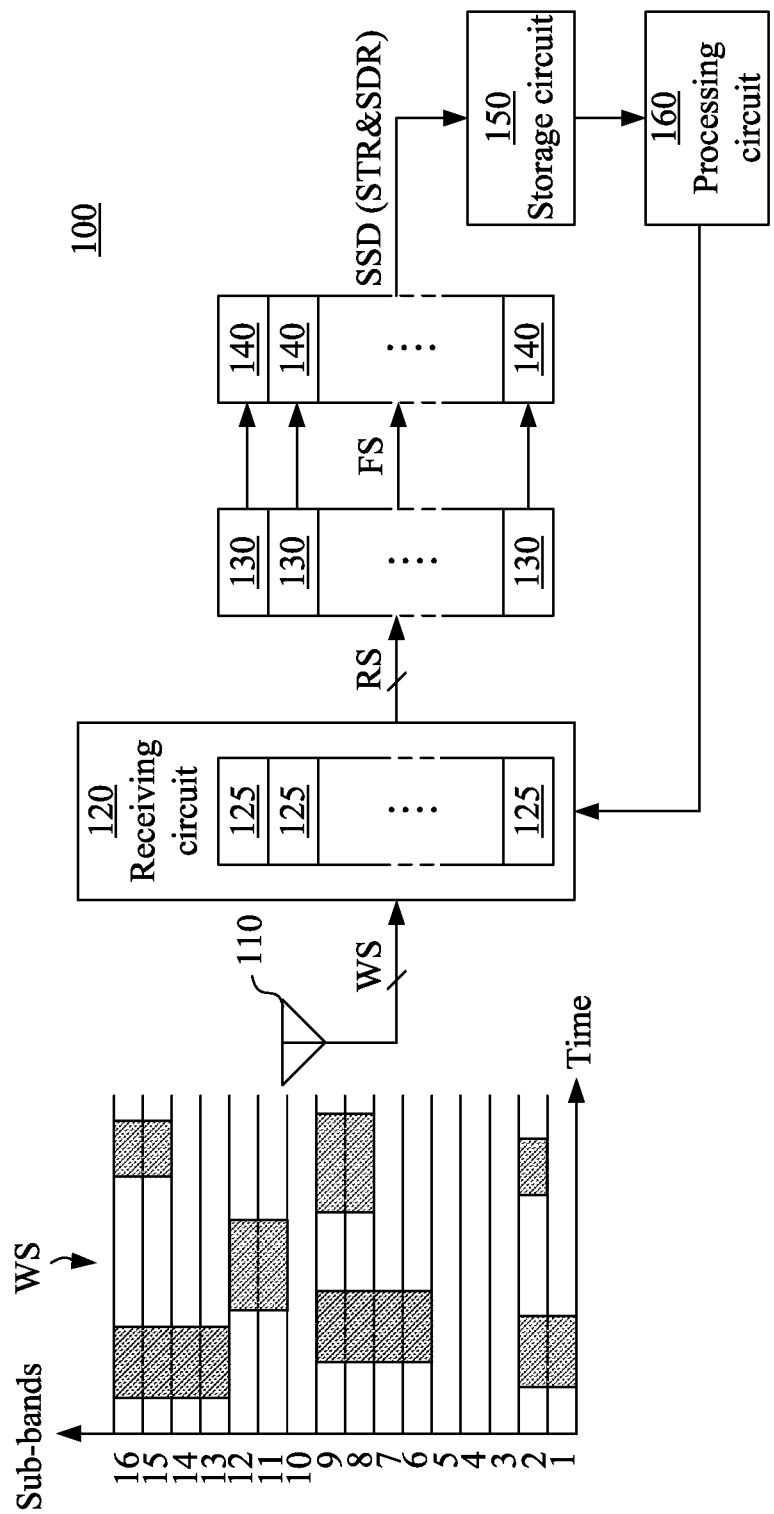
FIG. 1 illustrates a block diagram of a network communication apparatus having full band monitoring mechanism according to an embodiment of the present invention.

Reference is now made to FIG. 1. FIG. 1 illustrates a block diagram of a network communication apparatus 100 having full band monitoring mechanism according to an embodiment of the present invention. In an embodiment, the network communication apparatus 100 is a device that performs communication based on IEEE 802.11be standard, such as but not limited to an access point (AP) device. The network communication apparatus 100 includes an antenna circuit 110, a receiving circuit 120, a plurality of sub-band filtering circuits 130, a plurality of monitoring circuits 140, a storage circuit 150 and processing circuit 160.

The antenna circuit 110 is configured to receive a set of wireless signals WS in a full band. In an embodiment, the full band includes a range of 320 MHz and can be divided into a plurality of sub-bands, i.e., sub-channels. In an embodiment, the smallest unit of the sub-bands can be such as, but not limited to 20 MHz.

The wireless signals WS include data signals that are supposed to be transmitted to the network communication apparatus 100 and also include interference signals that are not supposed to be transmitted to the network communication apparatus 100. In FIG. 1, the set of wireless signals WS transmitted along with time corresponding to the Y-axis are exemplarily illustrated. Blocks arranged into a grid are illustrated that stand for the signals each occupying one or more sub-bands corresponding to the X-axis. In FIG. 1, different sub-bands are labeled by numbers of 1 to 16.

In an embodiment, the receiving circuit 120 is disposed in a radio frequency (RF) circuit and includes a plurality of receivers 125. The receivers 125 are configured to receive the set of wireless signals WS to generate a set of received signals RS. In an embodiment, each of the receivers 125 includes a plurality of mixers (not illustrated in the figure) having central frequency switching mechanism to set the central frequency of the receiving path (channel) that each of the receivers 125 corresponds to.

A first part of the receivers 125 operate in a service mode to perform data signal receiving corresponding to an operation frequency sub-band. More specifically, the first part of the receivers 125, corresponding to an operation frequency sub-band, receive the signals that are supposed to be transmitted to the network communication apparatus 100 and further transmit the signals to other data processing circuit (not illustrated in the figure) to process data included in the signals.

A second part of the receivers 125 operate in a monitoring mode to perform interference signal monitoring on a plurality of monitoring frequency sub-bands in the full band. More specifically, the second part of the receivers 125 receive the signals from all the sub-bands in the full band having the range of 320 MHz such that the signals of the sub-bands are monitored and statistics are performed thereon by using other circuits such as the sub-band filtering circuits 130 and the monitoring circuits 140 to determine the communication quality of the sub-bands.

In an embodiment, the receivers 125 described above not only receive the signals within the sub-bands corresponding to the smallest unit, but also are capable of receiving the signals of the sub-bands corresponding to a larger range (e.g., 40 or 80 MHz).

In an embodiment, the network communication apparatus 100 may selectively include an analog-to-digital circuit and a digital front end circuit (not illustrated in the figure) to perform analog-to-digital conversion on the received signals RS generated by the receivers 125 and perform such as, but not limited to frequency down-conversion thereon accordingly. The processed signals are further transmitted to the sub-band filtering circuits 130.

Each of the sub-band filtering circuits 130 is configured to perform filtering on the set of received signal RS generated by the receivers 125 that operate in the monitoring mode to generate a filtered signal FS. In an embodiment, each of the sub-band filtering circuits 130 performs filtering corresponding to a range of such as, but not limited to 20 MHz to generate the filtered signal FS in the corresponding sub-band range. In another embodiment, the sub-band filtering circuits 130 is configured to perform filtering on the received signals RS generated by all the receivers 125 to generate the filtered signal FS.

Each of the monitoring circuits 140 is configured to monitor the filtered signal FS generated by each of the sub-band filtering circuits 130 to generate signal parameter statistical data SSD. In an embodiment, the monitoring performed by the monitoring circuits 140 includes such as, but not limited to whether the filtered signal FS includes a preamble and an orthogonal frequency division multiplexing (OFDM) symbol and an intensity of a signal energy and a received signal strength indicator (RSSI). According to the monitoring described above, the signal parameter statistical data SSD generated by the monitoring circuits 140 includes such as, but not limited to a signal type statistic result STR and a signal intensity and distance statistic result SDR.

Figure 2:
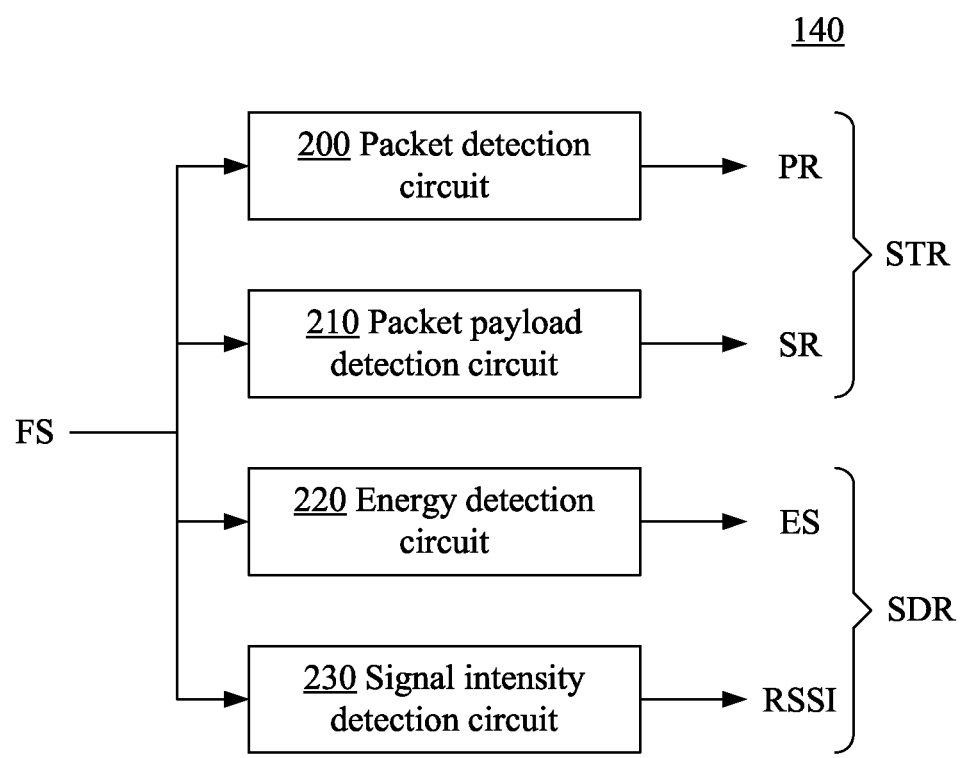
FIG. 2 illustrates a block diagram of the monitoring circuit according to an embodiment of the present invention.

Reference is now made to FIG. 2. FIG. 2 illustrates a block diagram of the monitoring circuit 140 according to an embodiment of the present invention. In an embodiment, the monitoring circuit 140 includes a packet detection circuit 200, a packet payload detection circuit 210, an energy detection circuit 220 and a signal intensity detection circuit 230.

The packet detection circuit 200 is configured to determine whether the filtered signal FS includes the preamble to generate a preamble determination result PR. The packet payload detection circuit 210 is configured to determine whether the filtered signal FS includes the OFDM symbol to generate a symbol determination result SR.

In an embodiment, the calculation of such as, but not limited to auto-correlation or cross-correlation can be performed on the filtered signal FS to determine whether the filtered signal FS includes the preamble and the OFDM symbol.

The preamble determination result PR and the symbol determination result SR can be used to identify the loading characteristic of the signals in each of the monitoring frequency sub-bands that each of the sub-band filtering circuits 130 corresponds to. More specifically, the signal type of the signals in each of the monitoring frequency sub-bands can be determined to identify whether the transmission of the wireless signals corresponds to WiFi or other communication protocols according to the preamble determination result PR and the symbol determination result SR.

In an embodiment, the packet detection circuit 200 and the packet payload detection circuit 210 further perform statistics on an accumulated number of the preamble determination result RP and the symbol determination result SR. The accumulated number of each of the preamble determination result RP and symbol determination result SR is included in the signal type statistic result STR.

The energy detection circuit 220 is configured to determine a signal energy ES of the filtered signal FS. The signal intensity detection circuit 230 is configured to determine a received signal strength indicator RSSI of the filtered signal FS.

The signal energy ES and the received signal strength indicator RSSI are used to identify the intensity of the signals in each of the monitoring frequency sub-bands that each of the sub-band filtering circuits 130 corresponds to, such that the degree of interference generated thereby can be determined. An interference distance of each of the signals can be estimated according to the received signal strength indicator RSSI.

In an embodiment, the energy detection circuit 220 and the signal intensity detection circuit 230 can further perform statistics on an average of each of the signal energy ES and the received signal strength indicator RSSI. The average of each of the signal energy ES and the received signal strength indicator RSSI is included in the signal intensity and distance statistic result SDR.

As a result, after the operation of the circuits described above, the monitoring circuits 140 generate the signal parameter statistical data SSD including the signal type statistic result STR and the signal intensity and distance statistic result SDR. It is appreciated that the circuits included in the monitoring circuits 140 and the parameters monitored thereby described above are merely an example. In other embodiments, the monitoring circuits 140 may include other circuits to monitor other parameters according to practical requirements.

The storage circuit 150 is configured to store the signal parameter statistical data SSD generated by the monitoring circuits 140. The processing circuit 160 operates monitoring software and/or hardware and is configured to access the signal parameter statistical data SSD from the storage circuit 150 through such as, but not limited to a direct memory access (DMA) circuit to determine a signal type and a signal intensity and distance of a corresponding one of the monitoring frequency sub-bands.

In an embodiment, the processing circuit 160 is further configured to set the operation frequency sub-band that the first part of the receivers 125 corresponds to according to the signal type and the signal intensity and distance of each of the monitoring frequency sub-bands.

More specifically, the processing circuit 160 can obtain the signal interference condition of each of the sub-bands according to the monitoring of the signal type and the signal intensity and distance of each of the sub-bands, so as to further determine the communication quality of each of the sub-bands. For example, the processing circuit 160 can perform the operation of such as, but not limited to setting the frequency to be detected within a predetermined time and determine the communication quality of each of the sub-bands according to the number and the energy amount of a specific detected signal type. Based on the communication quality of each of the sub-bands, the processing circuit 160 can control the network communication apparatus 100 to avoid the sub-bands having a worse communication quality and select the sub-bands having a better communication quality to perform communication. The communication can therefore be performed in the sub-bands having the better communication quality.

Figure 3A:
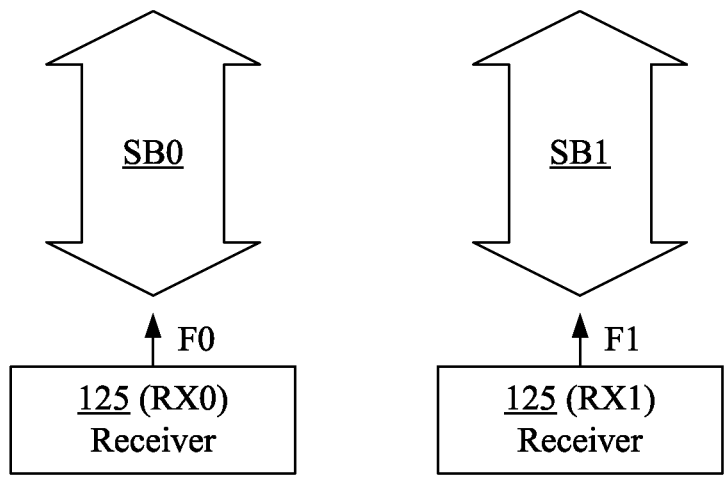
FIG. 3A and FIG. 3B illustrate diagrams of two receivers that respectively belong to the first part of the receivers and the second part of the receivers according to an embodiment of the present invention.
Figure 3B:
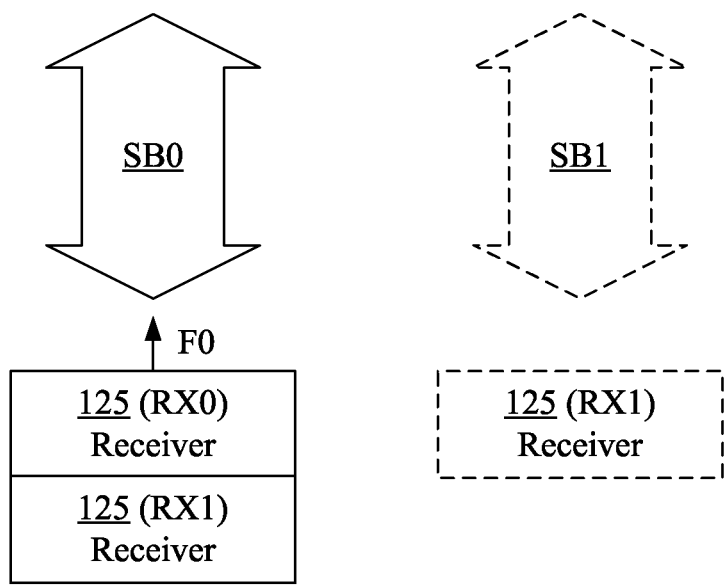

Reference is now made to FIG. 3A and FIG. 3B at the same time. FIG. 3A and FIG. 3B illustrate diagrams of two receivers 125 that respectively belong to the first part of the receivers 125 and the second part of the receivers 125 according to an embodiment of the present invention.

As illustrated in FIG. 3A, the receiver 125 that belongs to the first part of the receivers 125 is labeled as RX0 (which is called the receiver RX0 in the following paragraph), in which the receiver RX0 keeps operating in the service mode and sets a central frequency F0 so as to perform data signal receiving in a sub-band SB0 (operation frequency sub-band). The receiver 125 that belongs to the second part of the receivers 125 is labeled as RX1 (which is called the receiver RX1 in the following paragraph), in which the receiver RX1 operates in the monitoring mode, and sets a central frequency F1 so as to perform interference signal monitoring in a sub-band SB1 (monitoring frequency sub-band).

In some applications, the data signal requires a plurality of receivers operating together to receive. As a result, as illustrated in FIG. 3B, since each of the receivers includes the mixers having central frequency switching mechanism, the receiver RX1 is configured to shift the central frequency from F1 to F0 by using the mixers to switch to the sub-band SB0 when the receiving capability of the receiver RX0 is insufficient. The receiver RX1 thus cooperates with the receiver RX0 to perform data signal receiving. When the data signal receiving is finished performing, the receiver RX1 can switch back to the sub-band SB1 to keep performing monitoring.

Figure 4:
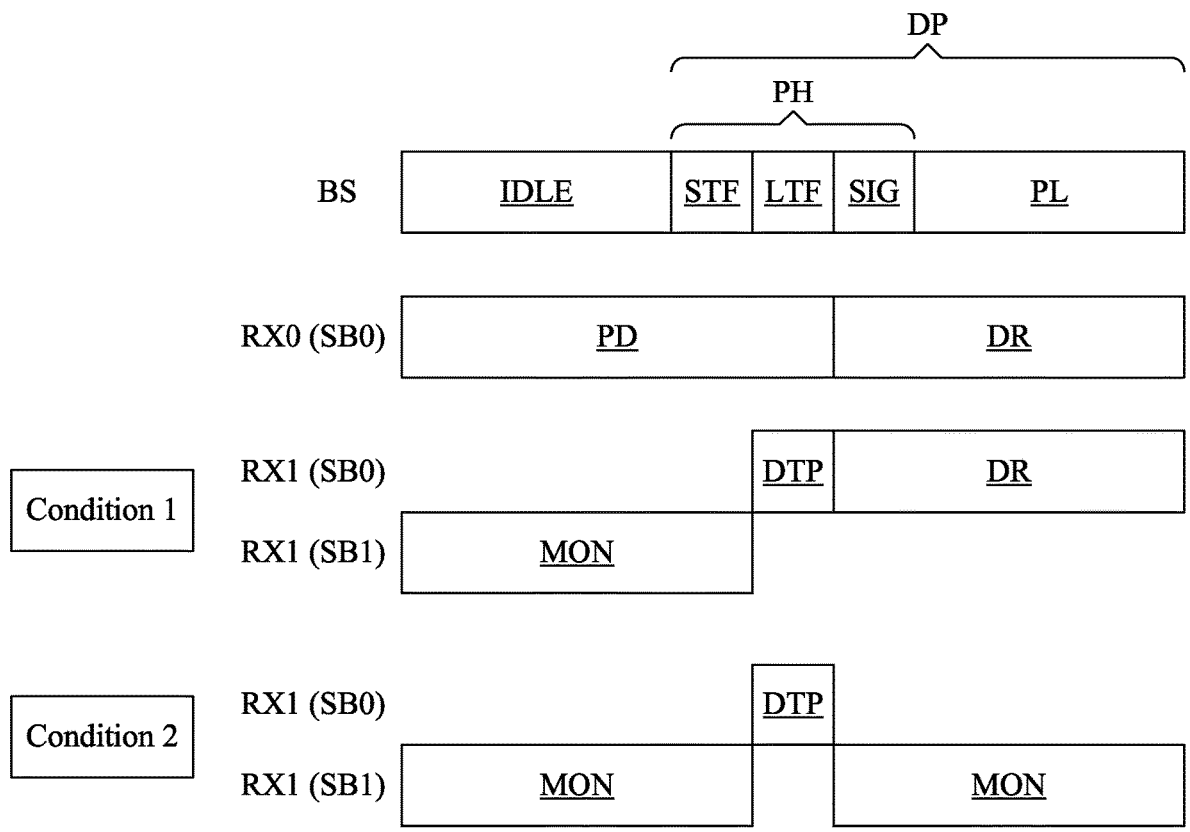
FIG. 4 illustrates a timing diagram of the operation that the receivers perform to receive a data packet according to an embodiment of the present invention.

Reference is now made to FIG. 4. FIG. 4 illustrates a timing diagram of the operation that the receivers 125 perform to receive a data packet DP according to an embodiment of the present invention.

FIG. 4 illustrates the frequency band status BS of the sub-band B0 (operation frequency sub-band) described above. At first, the frequency band status BS is at an idle status IDLE. Along with the arrival of the data packet DP, the receivers 125 in turn receive a packet header PH and a packet payload PL included in the data packet DP. The packet header PH further includes such as, but not limited to a short training field STF, a long training field LTF and a signal field SIG.

It is appreciated that the content included in the packet header PH described above is merely an example. In other embodiments, the packet header PH may selectively includes other entries.

The receiver RX0 performs packet detection PD corresponding to the sub-bands SB0. When the long training field LTF in the packet header PH is finished being detected, the receiver RX0 starts to perform packet data receiving DR. As a result, the receiver RX0 always performs data signal receiving on the sub-band SB0.

The receiver RX1 performs interference signal monitoring MON on the sub-band SB1 (monitoring frequency sub-band) at first. When the receiver RX0 receives the packet header PH, the receiver RX1 switches to the sub-band SB0 to perform determining process DTP to determine whether the receiving capability of the receiver RX0 is sufficient according to at least one of the short training field STF, the long training field LTF and the signal field SIG in the packet header PH.

As a result, corresponding to the condition 1 labeled in FIG. 4, when the receiving capability of the receiver RX0 is insufficient, the receiver RX1 keeps operating in the sub-band SB0 to perform packet data receiving DR, so as to cooperate with the receiver RX0 to perform data signal receiving. The receiver RX1 switches back to the corresponding sub-band SB1 to perform interference signal monitoring after the data signal receiving is finished.

Corresponding to the condition 2 labeled in FIG. 4, when the receiving capability of the receiver RX0 is determined to be sufficient by the receiver RX1 according to the determining process DTP, the receiver RX1 switches back to the corresponding sub-band SB1 to keep performing interference signal monitoring.

It is appreciated that the frequency band switching mechanism of the receivers described above can be performed under the control of the processing circuit 160 in FIG. 1. Moreover, the above embodiment is described based on the condition that the data signal requires two receivers to receive. In other embodiments, when the data signal requires more than two receivers to receive and the receiving capability of the receivers under the service mode is insufficient, the other receivers under the monitoring mode can switch the sub-bands to support the receivers under the service mode. The present invention is not limited thereto.

In some approaches, the frequency band monitoring mechanism is performed based on a time-division multiplexing method to control the receivers by software and/or hardware to keep switching back and forth from the operation frequency sub-band and all the sub-bands to be monitored until all the frequency bands are monitored. Such a method is not only time-consuming, but also unable to obtain a complete monitoring information.

As a result, the network communication apparatus 100 of the present invention avoids the time-consuming process and the incomplete information generated due to continuous switching among different frequency bands by using receivers operating in a monitoring mode and by disposing corresponding filter circuits and monitoring circuits, such that a quick and complete full band monitoring can be accomplished to select a sub-band with better condition to perform communication according to the frequency band monitoring result.

Figure 5:
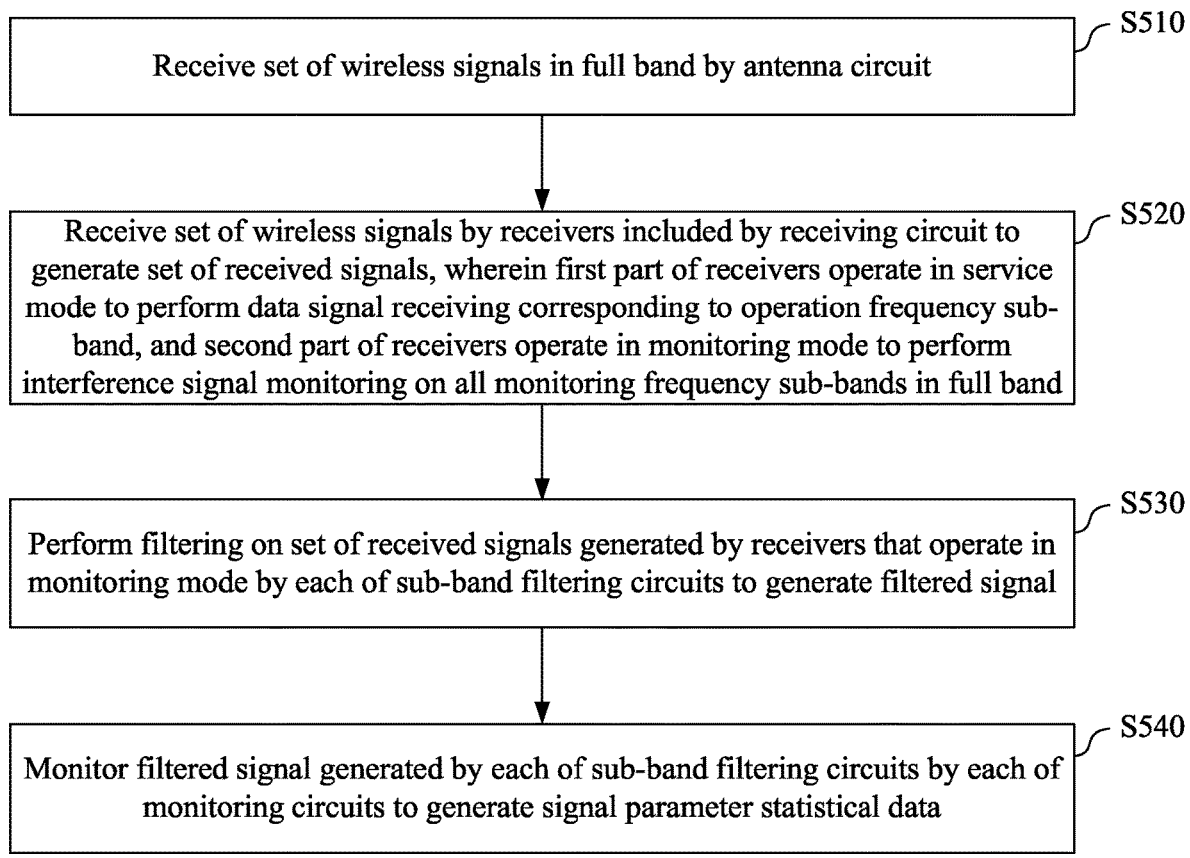
FIG. 5 illustrates a flow chart of a network communication monitoring method having full band monitoring mechanism according to an embodiment of the present invention.

Reference is now made to FIG. 5. FIG. 5 illustrates a flow chart of a network communication monitoring method 500 having full band monitoring mechanism according to an embodiment of the present invention.

In addition to the apparatus described above, the present disclosure further provides the network communication monitoring method 500 that can be used in such as, but not limited to, the network communication apparatus in FIG. 1. As illustrated in FIG. 5, an embodiment of the network communication monitoring method 500 includes the following steps.

In step S510, the set of wireless signals WS in the full band are received by the antenna circuit 110.

In step S520, the set of wireless signals WS are received by the receivers 125 included by the receiving circuit 120 to generate the set of received signals RS, wherein the first part of the receivers 125 operate in the service mode to perform data signal receiving corresponding to the operation frequency sub-band, and the second part of the receivers 125 operate in the monitoring mode to perform interference signal monitoring on all the monitoring frequency sub-bands in the full band.

In step S530, filtering is performed on the set of received signals RS generated by the receivers 125 that operate in the monitoring mode by each of the sub-band filtering circuits 130 to generate the filtered signal FS.

In step S540, the filtered signal FS generated by each of the sub-band filtering circuits 130 is monitored by each of the monitoring circuits 140 to generate the signal parameter statistical data SSD.

It is appreciated that the embodiments described above are merely an example. In other embodiments, it should be appreciated that many modifications and changes may be made by those of ordinary skill in the art without departing, from the spirit of the disclosure.

In summary, the present invention discloses the network communication apparatus and the network communication monitoring method thereof having full band monitoring mechanism avoid the time-consuming process and the incomplete information generated due to continuous switching among different frequency bands by using receivers operating in a monitoring mode and by disposing corresponding filter circuits and monitoring circuits, such that a quick and complete full band monitoring can be accomplished to select a sub-band with better condition to perform communication according to the frequency band monitoring result.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A network communication apparatus having full band monitoring mechanism, comprising:
    an antenna circuit configured to receive a set of wireless signals in a full band;
    a receiving circuit comprising a plurality of receivers configured to receive the set of wireless signals to generate a set of received signals, wherein a first part of the receivers operate in a service mode to perform data signal receiving corresponding to an operation frequency sub-band, and a second part of the receivers operate in a monitoring mode to perform interference signal monitoring on a plurality of monitoring frequency sub-bands in the full band;
    a plurality of sub-band filtering circuits configured to perform filtering on the set of received signals generated by the receivers that operate in the monitoring mode to generate a filtered signal; and
    a plurality of monitoring circuits configured to monitor the filtered signal generated by the sub-band filtering circuits to generate signal parameter statistical data.

2. The network communication apparatus of claim 1, wherein the monitoring circuits comprises:
    a packet detection circuit configured to determine whether the filtered signal comprises a preamble to generate a preamble determination result; and
    a packet payload detection circuit configured to determine whether the filtered signal comprises an orthogonal frequency division multiplexing (OFDM) symbol to generate a symbol determination result;
    wherein a signal type statistic result of the signal parameter statistical data comprises an accumulated number of the preamble determination result and the symbol determination result.

3. The network communication apparatus of claim 1, wherein the monitoring circuits comprises:
    an energy detection circuit configured to determine a signal energy of the filtered signal; and
    a signal intensity detection circuit configured to determine a received signal strength indicator (RSSI) of the filtered signal;
    wherein a signal intensity and distance statistic result of the signal parameter statistical data comprises the signal energy and the received signal strength indicator.

4. The network communication apparatus of claim 1, further comprising:
    a storage circuit configured to store the signal parameter statistical data; and
    a processing circuit configured to access the signal parameter statistical data from the storage circuit to determine a signal type and a signal intensity and distance of a corresponding one of the monitoring frequency sub-bands.

5. The network communication apparatus of claim 4, wherein the processing circuit is further configured to set the operation frequency sub-band used to perform communication according to the signal type and the signal intensity and distance of the monitoring frequency sub-bands.

6. The network communication apparatus of claim 1, wherein the receivers comprises a plurality of the mixers having central frequency switching mechanism, wherein when a receiving capability of the first part of the receivers is insufficient, the second part of the receivers are configured to switch to the operation frequency sub-band through the mixers to perform data signal receiving together with the corresponding first part of the receivers.

7. The network communication apparatus of claim 6, wherein the second part of the receivers switch back to the corresponding one of the monitoring frequency sub-bands after the data signal receiving is finished.

8. The network communication apparatus of claim 6, wherein the second part of the receivers are configured to switch to the operation frequency sub-band when the first part of the receivers receive a packet header, keep operating in the operation frequency sub-band when the receiving capability of the first part of the receivers are determined to be insufficient according to the packet header to perform data signal receiving together with the corresponding first part of the receivers, and switch back to the corresponding one of the monitoring frequency sub-bands when the receiving capability of the first part of the receivers are determined to be sufficient according to the packet header.

9. The network communication apparatus of claim 8, wherein the packet header comprises at least one of a short training field (STF), a long training field (LTF) and a signal field (SIG), the second part of the receivers determine whether the receiving capability of the first part of the receivers is sufficient according to at least one of the short training field, the long training field and the signal field.

10. The network communication apparatus of claim 1, wherein the network communication apparatus performs communication according to IEEE 802.11be standard.

11. A network communication monitoring method having full band monitoring mechanism comprising:
receiving a set of wireless signals in a full band by an antenna circuit;
receiving the set of wireless signals by a plurality of receivers comprised by a receiving circuit to generate a set of received signals, wherein a first part of the receivers operate in a service mode to perform data signal receiving corresponding to an operation frequency sub-band, and a second part of the receivers operate in a monitoring mode to perform interference signal monitoring on a plurality of monitoring frequency sub-bands in the full band;
performing filtering on the set of received signals generated by the receivers that operate in the monitoring mode by a plurality of sub-band filtering circuits to generate a filtered signal; and
monitoring the filtered signal generated by the sub-band filtering circuits by a plurality of monitoring circuits to generate signal parameter statistical data.

12. The network communication monitoring method of claim 11, further comprising:
determining whether the filtered signal comprises a preamble by a packet detection circuit comprised by the monitoring circuits to generate a preamble determination result; and
determining whether the filtered signal comprises an OFDM symbol by a packet payload detection circuit comprised by the monitoring circuits to generate a symbol determination result;
wherein a signal type statistic result of the signal parameter statistical data comprises an accumulated number of the preamble determination result and the symbol determination result.

13. The network communication monitoring method of claim 11, further comprising:
determining a signal energy of the filtered signal by an energy detection circuit comprised by the monitoring circuits; and
determining a RSSI of the filtered signal by a signal intensity detection circuit comprised by the monitoring circuits;
wherein a signal intensity and distance statistic result of the signal parameter statistical data comprises the signal energy and the received signal strength indicator.

14. The network communication monitoring method of claim 11, further comprising:
storing the signal parameter statistical data by a storage circuit; and
accessing the signal parameter statistical data from the storage circuit by a processing circuit to determine a signal type and a signal intensity and distance of a corresponding one of the monitoring frequency sub-bands.

15. The network communication monitoring method of claim 14, further comprising:
setting the operation frequency sub-band used to perform communication by the processing circuit according to the signal type and the signal intensity and distance of the monitoring frequency sub-bands.

16. The network communication monitoring method of claim 11, wherein the receivers comprises a plurality of the mixers having central frequency switching mechanism, the network communication monitoring method further comprises:
wherein when a receiving capability of the first part of the receivers is insufficient, switching the second part of the receivers to the operation frequency sub-band through the mixers to perform data signal receiving together with the corresponding first part of the receivers.

17. The network communication monitoring method of claim 16, further comprising:
switching the second part of the receivers back to the corresponding one of the monitoring frequency sub-bands after the data signal receiving is finished.

18. The network communication monitoring method of claim 16, further comprising:
switching the second part of the receivers to the operation frequency sub-band when the first part of the receivers receive a packet header, keeping operating the second part of the receivers in the operation frequency sub-band when the receiving capability of the first part of the receivers are determined to be insufficient according to the packet header to perform data signal receiving together with the corresponding first part of the receivers, and switching the second part of the receivers back to the corresponding one of the monitoring frequency sub-bands when the receiving capability of the first part of the receivers are determined to be sufficient according to the packet header.

19. The network communication monitoring method of claim 18, wherein the packet header comprises at least one of a short training field, a long training field and a signal field, the network communication monitoring method further comprises:
determining whether the receiving capability of the first part of the receivers is sufficient by the second part of the receivers according to at least one of the short training field, the long training field and the signal field.

20. The network communication monitoring method of claim 11, wherein the network communication apparatus performs communication according to IEEE 802.11be standard.

* * * * *